United States Patent
Makino

(10) Patent No.: US 12,511,951 B2
(45) Date of Patent: Dec. 30, 2025

(54) INFORMATION PROCESSING DEVICE AND METHOD

(71) Applicant: TOYOTA JIDOSHA KABUSHIKI KAISHA, Toyota (JP)

(72) Inventor: Shouta Makino, Toyokawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 21 days.

(21) Appl. No.: 18/644,546

(22) Filed: Apr. 24, 2024

(65) Prior Publication Data
US 2025/0046126 A1    Feb. 6, 2025

(30) Foreign Application Priority Data
Aug. 3, 2023  (JP) ................................. 2023-127276

(51) Int. Cl.
G07C 5/00  (2006.01)
(52) U.S. Cl.
CPC .................................... *G07C 5/008* (2013.01)
(58) Field of Classification Search
None
See application file for complete search history.

(56) References Cited

U.S. PATENT DOCUMENTS

| | | | |
|---|---|---|---|
| 8,295,950 B1* | 10/2012 | Wordsworth | B60H 1/3232 700/297 |
| 11,195,246 B2* | 12/2021 | Qiu | H04W 4/35 |
| 2012/0167605 A1* | 7/2012 | Ikemiya | F25D 11/003 62/126 |
| 2014/0092246 A1* | 4/2014 | Koo | H04N 7/183 348/143 |
| 2017/0161967 A1* | 6/2017 | Matsuo | G07C 5/00 |
| 2019/0210431 A1* | 7/2019 | Takizawa | B60H 1/3226 |
| 2019/0220812 A1* | 7/2019 | Kanaoka | G06Q 10/0833 |
| 2020/0193344 A1* | 6/2020 | Sham | G06Q 10/06311 |
| 2020/0231041 A1* | 7/2020 | Lavrich | B60P 3/20 |
| 2021/0170935 A1* | 6/2021 | Qiu | B60R 16/023 |
| 2021/0362732 A1* | 11/2021 | Sakurada | G06F 21/6245 |
| 2023/0206168 A1* | 6/2023 | Suzuki | H04W 4/025 |
| 2024/0328908 A1* | 10/2024 | Khinouche | G01N 1/2226 |

FOREIGN PATENT DOCUMENTS

JP    2005331123 A  * 12/2005

* cited by examiner

*Primary Examiner* — Muhammad Adnan
(74) *Attorney, Agent, or Firm* — SoraIP Inc.

(57) ABSTRACT

When the vehicle is in the parked state, the information processing device mounted on the vehicle acquires information on the state of the cooler box mounted on the vehicle, and performs processing related to notification of information on the state of the cooler box to the user terminal associated with the vehicle. The information processing device determines whether or not to notify the user terminal of the information regarding the state of the cooler box mounted in the vehicle according to the parking position of the vehicle and whether or not an object is contained in the cooler box.

4 Claims, 5 Drawing Sheets

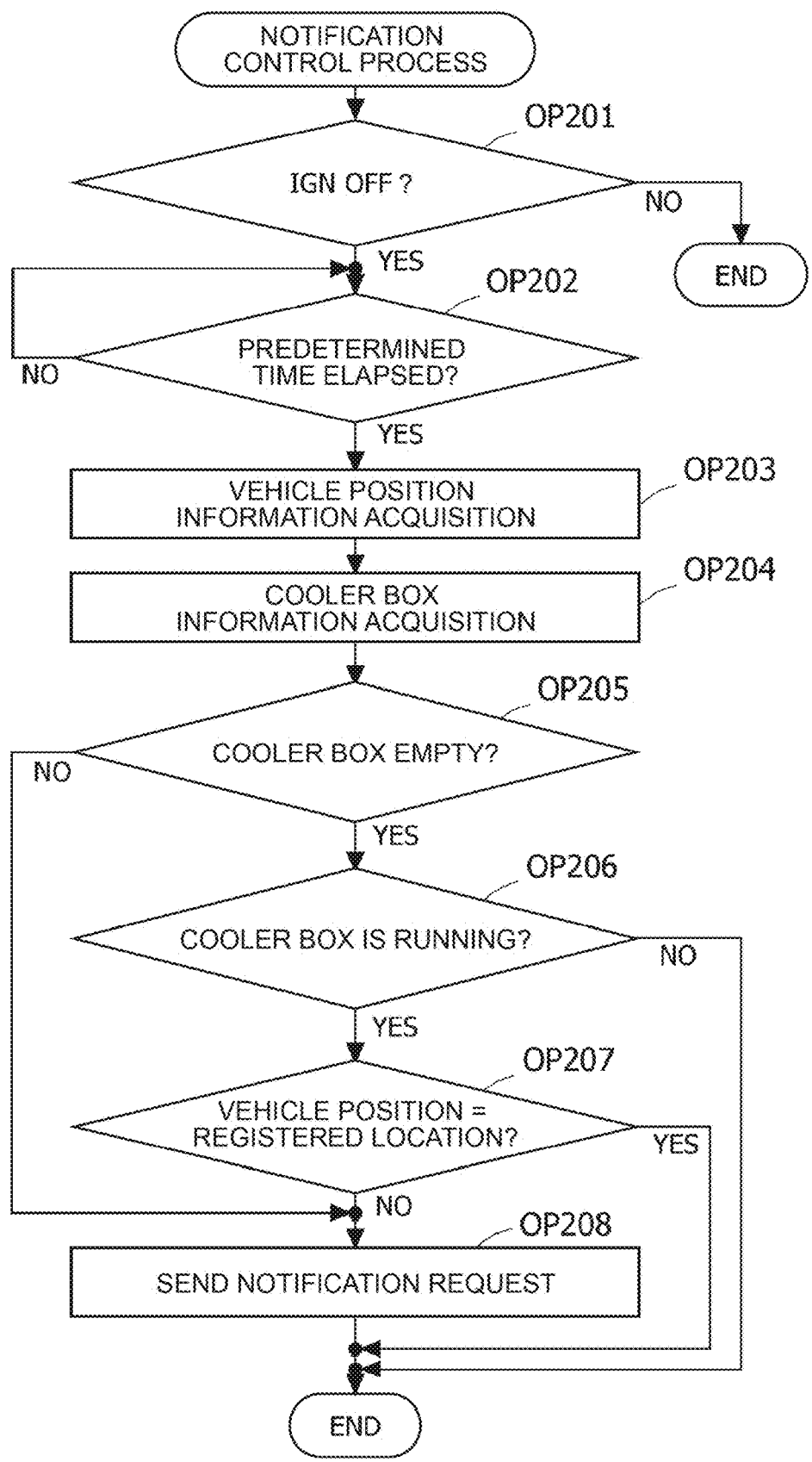

INFORMATION PROCESSING DEVICE AND METHOD

CROSS-REFERENCE TO RELATED APPLICATION

This application claims priority to Japanese Patent Application No. 2023-127276 filed on Aug. 3, 2023, incorporated herein by reference in its entirety.

BACKGROUND

1. Technical Field

The present disclosure relates to a vehicle on which a cooler box is mounted.

2. Description of Related Art

There is disclosed a power supply control device in which, when an ignition switch of a vehicle is turned off, power supply to an in-vehicle refrigerator is stopped if there is no article in the in-vehicle refrigerator, and the temperature in the refrigerator is maintained at a predetermined value or lower by controlling power supply from a battery if there is an article in the in-vehicle refrigerator (e.g. Japanese Unexamined Patent Application Publication No. 2005-331123 (JP 2005-331123 A)).

SUMMARY

An object of the present disclosure is to provide an information processing device and a method capable of reducing power consumption of a battery by a cooler box mounted on a vehicle.

An aspect of the present disclosure provides
an information processing device including a control unit configured to: acquire information about a state of a cooler box mounted on a vehicle when the vehicle is parked; and
perform a process of notifying a user terminal associated with the vehicle of the information about the state of the cooler box.

Another aspect of the present disclosure provides
a method including causing a computer to:
acquire information about a state of a cooler box mounted on a vehicle when the vehicle is parked; and
perform a process of notifying a user terminal associated with the vehicle of the information about the state of the cooler box.

According to the present disclosure, it is possible to reduce power consumption of a battery by a cooler box mounted on a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a diagram illustrating an example of a notification control process of the cooler box information of the vehicle 1.

DETAILED DESCRIPTION OF EMBODIMENTS

Figure 1:
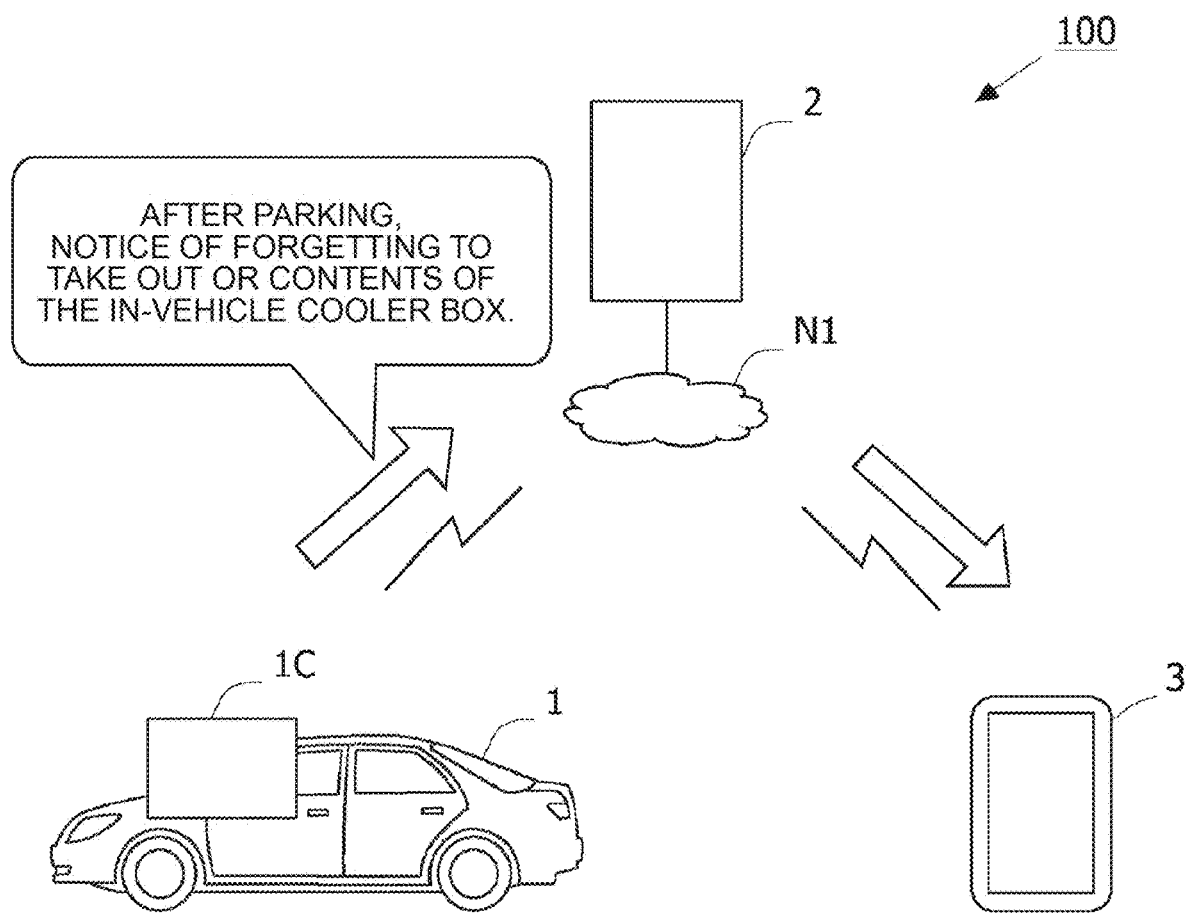
FIG. 1 is a diagram illustrating an example of a system configuration of a cooler box information notification system according to the first embodiment.

If the vehicle is equipped with a cooler box, the operator may forget to stop the cooler box. The operation of the cooler box during parking may reduce the remaining battery capacity, and the battery may not be powered and the vehicle may not be driven.

According to an aspect of the present disclosure, in view of the above problem, when a vehicle equipped with a cooler box is parked, information on a state of the cooler box is notified to a user terminal. More specifically, one aspect of the present disclosure is an information processing device including a control unit that executes, when a vehicle is in a parked state, information regarding a state of a cooler box mounted in the vehicle, and a process related to notification of information regarding a state of the cooler box to a user terminal associated with the vehicle.

The information processing device is, for example, an information processing device mounted on a vehicle or a server that exists independently of the vehicle. The information processing device mounted on the vehicle is, for example, a vehicle-specific communication device such as a Data Communication Module (DCM), or an Electronic Control Unit (ECU). The server is, for example, a dedicated computer and computer such as PC. The control unit may be, for example, a processor such as Central Processing Unit (CPU) and Graphics Processing Unit (GPU), and circuitry such as Field Programmable Gate Array (FPGA).

A cooler box mounted on a vehicle is a device capable of controlling a temperature in a cabin. The cooler box includes a refrigerator, a warm-storage, a freezer, and a warm-refrigerator. The information regarding the cooler box mounted on the vehicle includes, for example, information indicating an operation state of the cooler box, information indicating whether or not an object is contained in the cooler box, and the like.

The parking state of the vehicle is, for example, a state in which the ignition switch or the power switch of the vehicle is turned off or a state in which a predetermined time has elapsed since the ignition switch or the power switch of the vehicle is turned off. The user terminal associated with the vehicle is, for example, a terminal used by the owner or driver of the vehicle. The user terminal associated with the vehicle is a computer such as a smart phone, tablet terminal, wearable terminal, and Personal Computer (PC), for example.

For example, in a case where the information processing device is an apparatus mounted on the vehicle, the information processing device acquires information on the state of the cooler box from the cooler box, a sensor mounted on the cooler box, and the like. Further, in this case, as a process relating to notification of information regarding the state of the cooler box to the user terminal associated with the vehicle, the information processing device transmits information regarding the state of the cooler box to another apparatus such as a server capable of communicating with the user terminal, and requests notification to the user terminal.

For example, in a case where the information processing device is a server that exists independently of the vehicle, the information processing device acquires information regarding the state of the cooler box by receiving the information from a communication apparatus mounted on the vehicle. In addition, the information processing device notifies the user terminal of information on the state of the cooler box as a process related to the notification.

Regardless of whether the information processing device is a device or a server mounted on the vehicle, the process related to the notification may also include a process of determining whether or not to perform the notification.

According to one aspect of the present disclosure, when a vehicle is in a parked state, information regarding a state of a cooler box is notified to a user terminal. For example, if the user forgets to stop the cooler box, the user can recognize that the cooler box is in operation by the notification. Thereafter, the user performs an operation of stopping the cooler box, whereby the power consumption of the battery by the cooler box can be suppressed.

In one aspect of the present disclosure, the control unit may acquire the position information of the vehicle and determine whether to notify the user terminal according to whether or not the position information of the vehicle indicates a predetermined location registered in advance. For example, the control unit may determine to perform the notification when the position information of the vehicle indicates a predetermined location registered in advance, and may determine not to perform the notification when the position information of the vehicle does not indicate a predetermined location registered in advance. Alternatively, for example, the control unit may determine not to perform the notification when the position information of the vehicle indicates a predetermined location registered in advance, and may determine to perform the notification when the position information of the vehicle does not indicate a predetermined location registered in advance.

According to one aspect of the present disclosure, since the notification of the information regarding the state of the cooler box mounted on the vehicle can be limited according to the place where the vehicle is parked, it is possible to reduce the difficulty to the user due to the notification.

In one aspect of the present disclosure, the control unit may determine, as a process related to the notification, that the notification to the user terminal is to be made when an object is contained in the cooler box and the cooler box is empty and is operating, and may determine that the notification to the user terminal is not to be made when the cooler box is empty and is stopped. Accordingly, in a case where the user's attention to the cooler box mounted on the vehicle does not have to be made essentially, the notification to the user terminal is not made, so that the difficulty of the notification to the user can be reduced.

In one aspect of the present disclosure, the control unit may continue the operation state of the cooler box until the remaining battery capacity of the vehicle becomes less than the predetermined value when the cooler box is in operation when the vehicle is in the parking state, and stop the cooler box when the remaining battery capacity becomes less than the predetermined value. As a result, it is possible to suppress the battery being insufficient in the next operation of the vehicle due to the power consumption caused by the operation of the cooler box while the vehicle is parked.

As another aspect, the present disclosure can specify a process executed by the information processing device as a method executed by a computer. As another aspect, the present disclosure can also be specified as a program for causing a computer to execute the above-described method and a non-transitory computer-readable recording medium on which the program is recorded.

Hereinafter, embodiments of the present disclosure will be described with reference to the drawings. The configurations of the following embodiments are illustrative, and the present disclosure is not limited to the configurations of the embodiments.

First Embodiment

FIG. 1 is a diagram illustrating an exemplary system configuration of a cooler box information notification system 100 according to the first embodiment. The cooler box information notification system 100 includes a vehicle 1, a center server 2, and a user terminal 3. The vehicle 1, the center server 2, and the user terminal 3 are connected to a network N1. The network N1 is, for example, a public network such as the Internet.

In the first embodiment, the vehicle 1 is assumed to be an engine-driven vehicle. However, the vehicle 1 is not limited to an engine-driven vehicle, and may be a battery electric vehicle driven by an electric motor. The vehicle 1 is equipped with a cooler box 1C.

In the first embodiment, when the vehicle 1 is parked, the vehicle 1 detects that the cooler box 1C has been stopped or that the contents of the cooler box 1C have been removed, and notifies the user terminal 3 via the center server 2. Upon receiving a notification request from the vehicle 1, the center server 2 transmits the notification to the user terminal 3. When the user of the user terminal 3 receives the notification, the user can, for example, stop the cooler box 1C or take out an object from the cooler box 1C by going to the vehicle 1 or remotely operating the user terminal 3.

In the first embodiment, after parking of the vehicle 1, the user terminal 3 is notified of forgetting to stop the cooler box 1C or forgetting to take out the contents, so that the user of the user terminal 3 can be prompted to stop the cooler box 1C, and the power dissipation of the battery of the vehicle 1 can be reduced.

Figure 2:
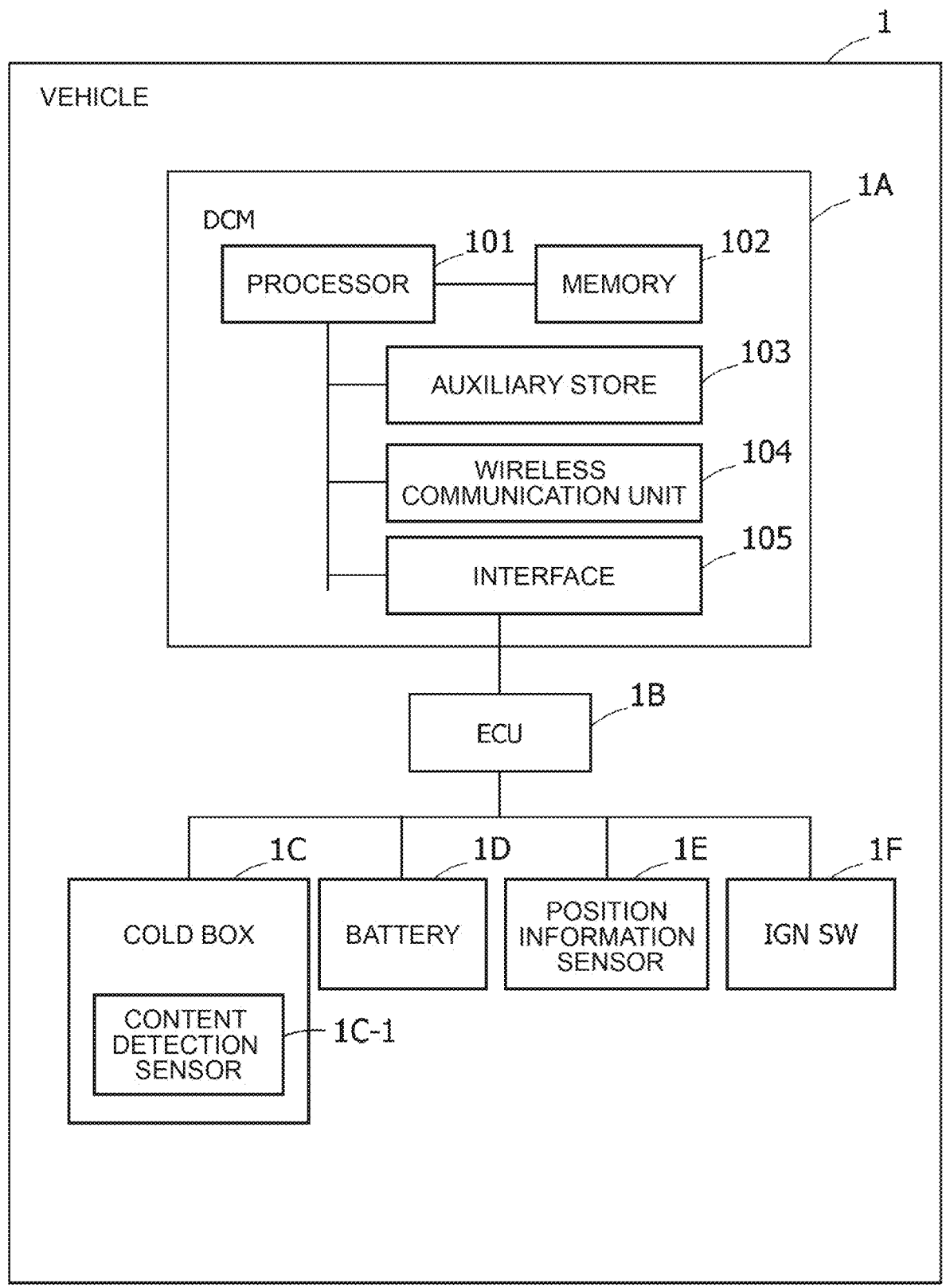
FIG. 2 is a diagram illustrating an example of a hardware-configuration of a vehicle.

FIG. 2 is a diagram illustrating an exemplary hardware configuration of vehicle 1. In FIG. 2, a configuration related to the process of the cooler box information notification system 100 is extracted from the hardware configuration of the vehicle 1, and the hardware configuration of the vehicle 1 is not limited to that shown in FIG. 2. The vehicle 1 includes, as hardware configurations, a DCM 1A, ECU 1B, a cooler box 1C, a battery 1D, a position information sensor 1E, and a IGN switching 1F. DCM 1A and ECU 1B are connected by, for example, an in-vehicle Local Area Network (LAN). ECU 1B, the cooler box 1C, the battery 1D, the position information sensor 1E, and IGN switching 1F are connected by, for example, a Controller Area Network (CAN). However, the methods of connecting DCM 1A, ECU 1B, the cooler box 1C, the battery 1D, the position information sensor 1E, and IGN switching 1F are not limited thereto.

The cooler box 1C is, for example, a storage capable of adjusting the temperature in a refrigerator, a freezer, a warm storage, a warm refrigerator, or the like. For example, the cooler box 1C is activated and deactivated by a user's manipulation. The cooler box 1C may be remotely activated and deactivated from the user terminal 3 through a DCM 1A. Whether the cooler box 1C is in operation or stopped may be detected by, for example, whether power is supplied from the battery 1D or not, or may be detected by outputting an operating signal when the power switch of the cooler box 1C is operated.

The cooler box 1C includes a content detection sensor 1C-1 in the storage. The content detection sensor 1C-1 is a sensor that detects the presence of an object in the warehouse. The content detection sensor 1C-1 is, for example, a sonar sensor, a photoelectric sensor, a fiber sensor, or a camera. The content detection sensor 1C-1 detects the presence or absence of an object in the cooler box 1C and outputs a detection result to ECU 1B.

The position information sensor 1E acquires position information of the present position of the vehicle 1. The position information sensor 1E is, for example, a Global Positioning System (GPS) receiver. The position information acquired by the position information sensor 1E is, for example, latitude and longitude. The position information sensor 1E acquires position information at a predetermined cycle, for example, and outputs the position information to ECU 1B.

IGN switch 1F is a switch for controlling the engine and the electric system of the center server 2. In the first embodiment, when a predetermined period of time has elapsed since IGN switching 1F was turned off, the parking condition of the vehicle 1 is determined. The time length for which the parking state is determined is set to a value between 5 minutes and 30 minutes, for example. When IGN switch 1F is turned on or off, on or off of IGN switch 1F is detected by outputting these operation signals to ECU 1B. In the first embodiment, the on/off operation of IGN switching 1F is also transmitted to DCM 1A via ECU 1B. When the vehicle 1 is in battery electric vehicle, a power switch for turning on and off the electric motor is provided instead of IGN switch 1F.

In the first embodiment, in response to a request from DCM 1A, ECU 1B acquires the position information from the position information sensor 1E of the center server 2, the information indicating the operation status indicating the operation or the stoppage of the cooler box 1C from the cooler box 1C, the information indicating the presence or absence of the object in the cooler box 1C from the content detection sensor 1C-1, and the remaining power from the battery 1D, and outputs the acquired information to DCM 1A.

In the first embodiment, when the vehicle 1 is parked, DCM 1A detects that the cooler box 1C has been stopped or that the contents of the cooler box 1C have been removed, and notifies the user terminal 3 through the center server 2. DCM 1A includes, as a hardware configuration, a processor 101, a memory 102, an auxiliary storage device 103, a wireless communication unit 104, and interfaces 105 with an in-vehicle network. The memory 102 and the auxiliary storage device 103 are computer-readable recording media.

The auxiliary storage device 103 stores various programs and data used by the processor 101 when executing the programs. The auxiliary storage device 103 is, for example, a Erasable Programmable Read-Only Memory (EPROM), a hard disk drive, or a Solid State Drive (SSD). Examples of the program stored in the auxiliary storage device 103 include an operating system (OS), an application program, and a notification determination program. The notification determination program is a program that, when the vehicle 1 is in the parking state, determines whether or not the notification of the state of the cooler box 1C to the user terminal 3 can be performed.

The memory 102 is a storage device that provides a storage area and a work area for loading programs stored in the auxiliary storage device 103 to the processor 101, and is used as a buffer. The memory 102 includes, for example, a solid-state memory such as a read only memory (ROM), and a random access memory (RAM).

The processor 101 loads the program held in the auxiliary storage device 103 into the memory 102 and executes the program, thereby executing various kinds of processing. The processor 101 is, for example, a CPU, GPU, or a Digital Signal Processor (DSP). The number of processors 101 is not limited to one, and a plurality of processors may be provided. The processor 101 is an example of a "control unit".

The wireless communication unit 104 is connected to a network N1 through a mobile communication network such as 5G, LTE, 6G, and enables communication with the center server 2. It should be noted that the hardware configuration of the vehicle 1 is not limited to that shown in FIG. 1. DCM 1A may be a device comprising electric circuitry such as a dedicated Field-Programmable Gate Array (FPGA) or Application Specific Integrated Circuit (ASIC) for performing the process.

The center server 2 includes, for example, a processor, a memory, an auxiliary storage device, and a communication unit as a hardware configuration. The user terminal 3 includes, for example, a processor, a memory, an auxiliary storage device, a wireless communication unit, and a touch panel display as a hardware configuration. The processor, the memory, and the auxiliary storage device included in the center server 2 and the user terminal 3 are the same as the processor 101, the memory 102, and the auxiliary storage device 103, respectively. The communication unit included in the center server 2 may be, for example, an interface connected to a wired network such as a LAN or an optical line, or a wireless communication circuit connected to a wireless network. The wireless communication unit included in the user terminal 3 is the same as the wireless communication unit 104. Note that the hardware configuration of each of the center server 2 and the user terminal 3 is not limited thereto.

Figure 3:
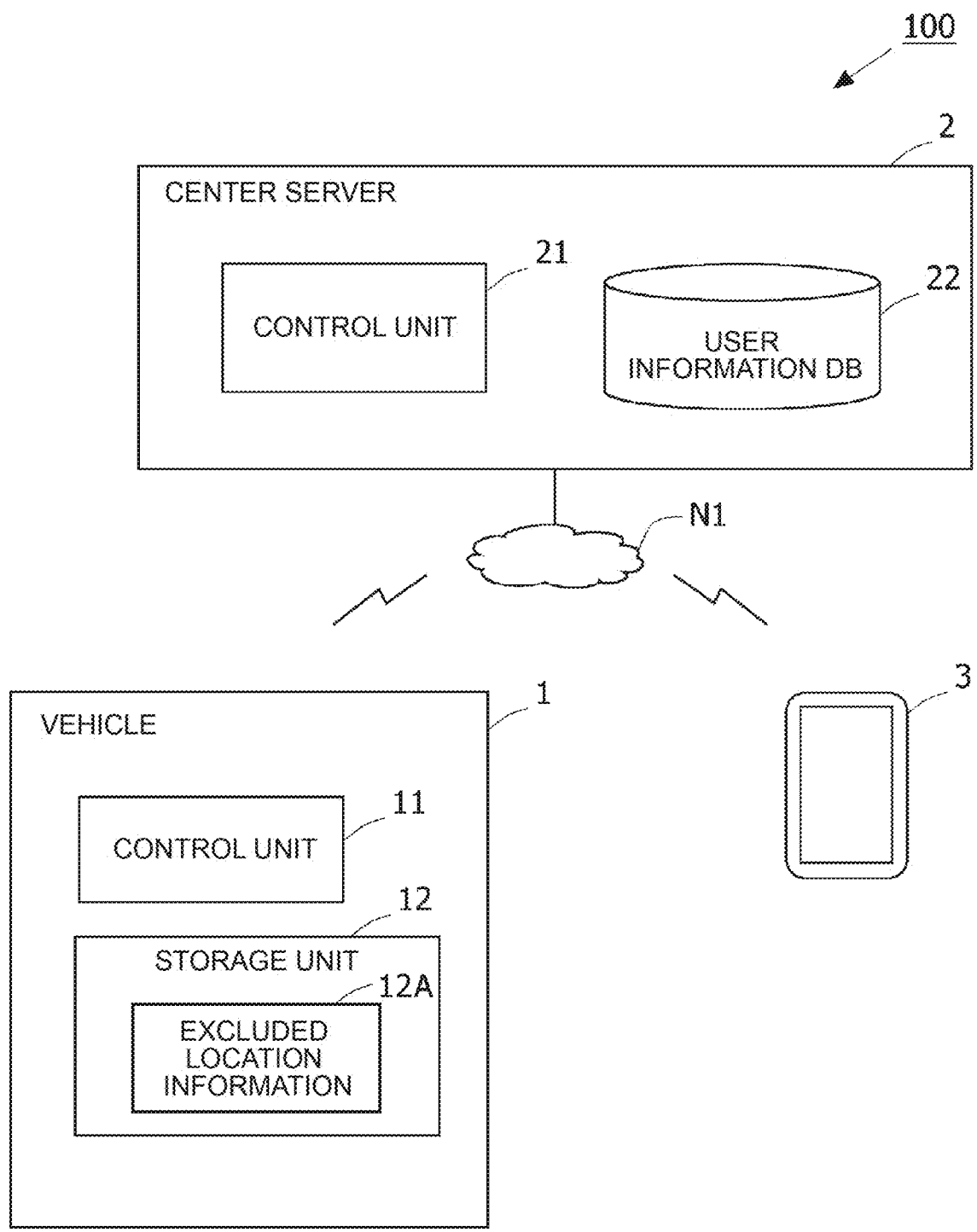
FIG. 3 is a diagram illustrating an example of a functional configuration of a vehicle and center server.

FIG. 3 is a diagram illustrating an exemplary functional of the vehicle 1 and the center server 2. The vehicle 1 includes a control unit 11 and a storage unit 12 as a functional configuration. Processing of these functional components is achieved, for example, by the processor 101 of DCM 1A executing a predetermined program stored in the auxiliary storage device 103. Alternatively, each of these functional components may be hardware such as a FPGA. It should be noted that, in FIG. 3, the functional components related to the process of the cooler box information notification system 100 among the functional components of the vehicle 1 are extracted and shown.

The storage unit 12 is created in a storage area of the auxiliary storage device 103. The storage unit 12 holds the excluded location information 12A. The excluded location information 12A is information on a location to be excluded from the notification of the information on the status of the cooler box 1C to the user terminal 3. The excluded location information is registered in advance by, for example, a user of the user terminal 3. For example, a user of the user terminal 3, when returning from shopping, obviously retrieves the items in the cooler box 1C, and registers the home in the excluded location information 12A when considering that notification of information about the status of the cooler box 1C is not necessary. The excluded location information 12A includes, for example, latitude, longitude, or address as information of a location designated by the user.

In the first embodiment, when IGN switching 1F is detected to be turned off, the control unit 11 performs a cooler box stopping control process and a notification control process of cooler box information. The cooler box stop control process is a process of monitoring the remaining power amount of the battery 1D during parking of the vehicle 1 and stopping the cooler box 1C when the remaining power amount of the battery 1D becomes less than a predetermined amount. Details of the cooler box stop control process will be described later.

The notification control process of the cooler box information is a process of determining whether or not the notification of the cooler box information to the user terminal 3 is executable based on the position information of the vehicle 1 and the cooler box information. The cooler box information includes, for example, information indicating an operation status indicating the operation or stoppage of the cooler box 1C and information indicating the presence or absence of an object in the storage.

In the first embodiment, when an object is present in the interior of the cooler box 1C, the control unit 11 determines whether to notify the user terminal 3 of the cooler box information regardless of the operation status of the cooler box 1C and the position of the vehicle 1. When the interior of the cooler box 1C is empty, the control unit 11 determines whether or not to notify the user terminal 3 of the cooler box information based on the position information of the vehicle 1. When the position information of the vehicle 1 is other than the place registered in the excluded location information 12A, the control unit 11 determines the execution of the notification, and when the position of the vehicle 1 is the place registered in the excluded location information 12A, determines the non-execution of the notification.

When it is determined that the notification of the cooler box information to the user terminal 3 is to be performed, the control unit 11 transmits a notification request to the user terminal 3 to the center server 2. Along with the notification request, for example, identification information of the vehicle 1 and cooler box information are also transmitted. Details of the notification control process of the cooler box information will be described later.

The center server 2 includes a control unit 21 and a user information DB 22 as functional components. Processing of these functional components is achieved, for example, by the processor of the center server 2 executing a predetermined program stored in the auxiliary storage device. Alternatively, each of these functional components may be hardware such as a FPGA.

The control unit 21 receives a notification request from the vehicle 1. Along with the notification request, for example, identification information of the vehicle 1 and cooler box information are also received. Upon receiving the notification request, the control unit 21 identifies the user terminal 3 associated with the identification information of the vehicle 1 from the user information DB 22, which will be described later, and notifies the user terminal 3 of the cooler box information of the vehicle 1. The method of notifying the user terminal 3 of the cooler box information may be, for example, any of a push notification and an e-mail.

The user information DB 22 is created in a storage area of the secondary storage device of the center server 2. The user information DB 22 holds user information. The user information includes, for example, identification information of the user of the user terminal 3, identification information of the user terminal 3, identification information of the vehicle 1, and information on a contact address of the user terminal 3. The information related to the contact of the user terminal 3 is, for example, information used for push delivery, an e-mail address, or the like. The functional configurations of the vehicle 1 and the center server 2 are not limited to those shown in FIG. 3.

Processing Flow

Figure 4:
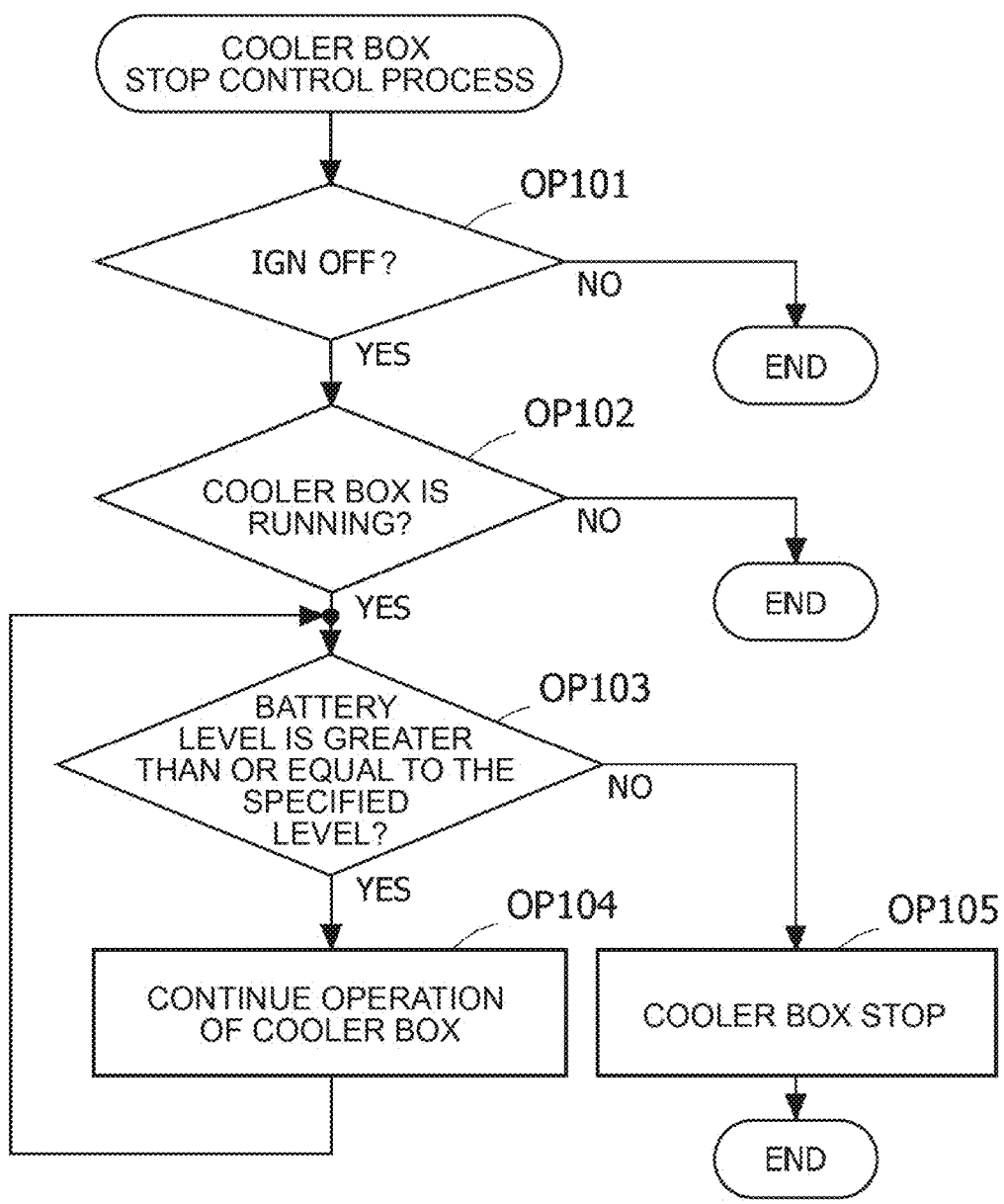
FIG. 4 is an example of a flow chart of a cooler box shutdown control process for vehicle.

FIG. 4 is an exemplary flow chart of a cooler box stopping control process of vehicle 1. The process shown in FIG. 4 is repeatedly executed at a predetermined cycle. The process shown in FIG. 4 is executed by hardware such as a processor or a FPGA of a DCM 1A, but for convenience, the functional components will be mainly described. The same applies to the flow charts of FIG. 4 and subsequent drawings.

In OP 101, the control unit 11 determines whether or not IGN switching 1F is turned off. When IGN switching 1F is turned off (OP 101: YES), the process proceeds to OP 102. When IGN switching 1F is not turned off (OP 101: NO), the process shown in FIG. 4 ends.

In OP 102, the control unit 11 determines whether or not the cooler box 1C is in operation. The information indicating the operation status of the cooler box 1C is acquired through ECU 1B. If the cooler box 1C is in operation (OP 102: YES), the process proceeds to OP 103. When the cooler box 1C is stopped (OP 102: NO), the process shown in FIG. 4 ends.

In OP 103, the control unit 11 determines whether or not the remaining power amount of the battery 1D is equal to or greater than a predetermined amount. The remaining power of the battery 1D is acquired through ECU 1B. When the remaining power amount of the battery 1D is equal to or greater than the predetermined amount (OP 103: YES), the process proceeds to OP 104. In OP 104, the control unit 11 determines continuation of the operation status of the cooler box 1C. Thereafter, the process proceeds to OP 103.

When the remaining power amount of the battery 1D is less than the predetermined amount (OP 103: NO), the process proceeds to OP 105. In OP 105, the control unit 11 stops the cooler box 1C. Thereafter, the process shown in FIG. 4 ends. Note that the cooler box stopping control process is not limited to the process shown in FIG. 4, and can be appropriately changed according to the embodiment. For example, the control unit 11 may execute OP 102 process after IGN switching 1F is turned off (OP 101: YES) and after a predetermined period in which the vehicle 1 is determined to be parked.

FIG. 5 is a diagram illustrating an example of a notification control process of the cooler box information of the vehicle 1. The process shown in FIG. 5 is repeatedly executed at a predetermined cycle. In OP 201, the control unit 11 determines whether or not IGN switching 1F is turned off. When IGN switching 1F is turned off (OP 201: YES), the process proceeds to OP 202. When IGN switching 1F is not turned off (OP 201: NO), the process shown in FIG. 5 ends.

In OP 202, the control unit 11 determines whether or not a predetermined period of time has elapsed since the battery 1D was turned off. When a predetermined period of time has elapsed since the battery 1D was turned off (OP 202: YES), the control unit 11 determines the parking condition of the vehicle 1, and the process proceeds to OP 203. When the predetermined period of time has not elapsed since the battery 1D was turned off (OP 202: NO), the control unit 11 waits until the predetermined period of time has elapsed.

In OP 203, the control unit 11 acquires the position data of the vehicle 1 through ECU 1B. In OP 204, the control unit 11 acquires the cooler box data through ECU 1B.

In OP 205, the control unit 11 determines whether or not the interior of the cooler box 1C is empty based on the cooler box data. If the interior of the cooler box 1C is empty (OP 205: YES), the process proceeds to OP 206. If there is an object inside the cooler box 1C (OP 205: NO), the process proceeds to OP 208.

In OP 206, the control unit 11 determines whether or not the cooler box 1C is in operation based on the cooler box data. If the cooler box 1C is in operation (OP 206: YES), the process proceeds to OP 207. When the cooler box 1C is stopped (OP 206: NO), the control unit 11 determines that the notification of the cooler box information to the user terminal 3 is not performed, and the process illustrated in FIG. 5 ends.

In OP 207, the control unit 11 determines whether or not the position information of the vehicle 1 is a location registered in the excluded location information 12A. When the position information of the vehicle 1 is a location registered in the excluded location information 12A (OP 207: YES), the control unit 11 determines that the notification of the cooler box information to the user terminal 3 is not performed, and the process shown in FIG. 5 ends. When the position information of the vehicle 1 is not registered in the excluded location information 12A (OP 207: NO), the control unit 11 determines that the notification of the cooler box information to the user terminal 3 is performed, and the process proceeds to OP 208.

In OP 208, the control unit 11 transmits a notification request to the center server 2. The identification information of the vehicle 1 and the cooler box information are also transmitted together with the notification request. Thereafter, the process shown in FIG. 5 ends. Note that the notification control processing of the cooler box information is not limited to the processing shown in FIG. 5.

Action Effect of First Embodiment

According to the process shown in FIG. 5, when the user of the user terminal 3 turns off IGN switching 1F of the vehicle 1 and after a predetermined time has elapsed from the time of leaving the vehicle 1 (OP 202: YES), the cooler box 1C includes an object (forgetting to take out the contents) (OP 205: NO), and when the cooler box 1C is in operation (forgetting to stop operation) (OP 206: YES) and the parking location of the vehicle 1 is other than the location registered in the excluded location information 12A (OP 207: NO) when the inside of the cooler box 1C is empty (OP 205: YES), the cooler box information is notified to the user terminal 3 through the center server 2. Accordingly, when the user of the user terminal 3 forgets to stop the cooler box 1C or forgets to take out the contents, reminder can be made. When the user of the user terminal 3 forgets to stop the cooler box 1C, for example, the user of the user terminal 3 performs the stop operation of the cooler box 1C, so that the power dissipation of the battery 1D due to the cooler box 1C in parking of the vehicle 1 can be reduced.

Further, even if the inside of the cooler box 1C is empty (OP 205: YES) and the cooler box 1C is in operation (forgetting to stop operation) (OP 206: YES), if the parking location of the vehicle 1 is a location registered in the excluded location information 12A (OP 207: YES), the cooler box information is not notified to the user terminal 3. As a result, the cooler box information is not notified when the vehicle is parked in the place designated by the user, so that it is possible to reduce the trouble caused by the notification of the cooler box information.

For example, after the user of the user terminal 3 turns off IGN switching 1F of the vehicle 1, prior to the elapse of the predetermined time length used in OP 202, the cooler box stop control process shown in FIG. 4 stops the cooler box 1C due to the remaining power of the battery 1D being less than the predetermined amount (OP 103: NO, OP 105), and when the cooler box 1C is empty (OP 205: YES), the user terminal 3 is not notified of the cooler box information (OP 206: NO). Further, for example, even when the user of the user terminal 3 forgets to stop the cooler box 1C and does not perform the stopping operation of the cooler box 1C even after the notification of the cooler box information to the user terminal 3, the cooler box 1C is stopped by the remaining power of the battery 1D becoming less than the predetermined amount over time (OP 103: NO) (OP 105). Accordingly, even when the user forgets to stop the cooler box 1C, it is possible to suppress the remaining power of the battery 1D being consumed so much that the vehicle 1 cannot be driven during parking.

Other Embodiments

The above-described embodiment is merely an example, and the present disclosure may be appropriately modified and implemented without departing from the scope thereof.

In the notification control process of the cooler box information (FIG. 5) in the first embodiment, when the interior of the cooler box 1C is empty (OP 205: YES), the cooler box 1C is in operation (OP 206: YES), and the vehicle 1 is parked in a location registered in the excluded location information 12A (OP 207: YES), the cooler box information is not notified to the user terminal 3. However, the present disclosure is not limited thereto, and in a case where the inside of the cooler box 1C is empty (OP 205: YES), the cooler box 1C is in operation (OP 206: YES), and the vehicle 1 is parked in a place registered in advance, the control unit 11 may determine the execution of the notification of the cooler box information to the user terminal 3, and in a case where the vehicle 1 is parked in a place other than the place registered in advance, may determine the non-execution of the notification.

Further, even if there is an object in the cooler box 1C, if the vehicle 1 is parked at a predetermined location, the control unit 11 may determine that the notification of the cooler box information to the user terminal 3 is not performed. The predetermined location is, for example, a facility such as a camping park, in which it is highly likely that parking is completed in a temporary parking and in a relatively short time. The predetermined location as described above may be registered by, for example, the user of the user terminal 3 in advance, or may be determined by the control unit 11 from map information or the like.

In addition, even if an object is present in the cooler box 1C, when the cooler box 1C is in operation or is stopped, the control unit 11 may determine that the notification of the cooler box information to the user terminal 3 is not performed. As described above, the condition of the execution or non-execution of the notification of the cooler box information to the user terminal 3 can be arbitrarily set according to the embodiment by using the position information of the vehicle 1, the operation status of the cooler box 1C, and the presence or absence of an object in the cooler box 1C.

In the notification control process of the cooler box information in the first embodiment (FIG. 5), whether or not the notification of the cooler box information can be performed is determined based on the operation status of the cooler box 1C, the presence or absence of objects in the storage, and the position information of the vehicle 1, but the present disclosure is not limited thereto. The control unit 11 may determine whether or not to notify the cooler box 1C of the cooler box information on the basis of one or two pieces of information among the information indicating the operation status of the cooler box 1C, the information indicating the presence or absence of an object in the interior of the cooler box 1C, and the position information of the vehicle 1.

For example, the control unit 11 may not use the information indicating the presence or absence of an object in the cooler box 1C and the position information of the vehicle 1, but may determine whether to notify the cooler box information whenever the cooler box 1C is in operation based on the information indicating the operation status of the cooler box 1C. For example, the control unit 11 may determine the execution of the notification of the cooler box information based on the position information of the vehicle 1 without using the information indicating the operation status of the cooler box 1C and the information indicating the presence or absence of an object in the interior of the cooler box 1C. Alternatively, the control unit 11 may determine the execution of the notification of the cooler box information each time IGN switching 1F is turned off, without using any of the information indicating the operation status of the cooler box 1C, the information indicating the presence or absence of an object in the interior of the cooler box 1C, and the position information of the vehicle 1.

In addition, in the notification control process of the cooler box information (FIG. 5) according to the first embodiment, the parking state of the vehicle 1 is determined based on the elapsed time since IGN switching 1F is turned off. However, the determination of the parking state of the vehicle 1 is not limited to this. For example, the control unit 11 may determine the parking state of the vehicle 1 by setting the distance between the vehicle 1 and the user terminal 3 to a predetermined distance or more. The fact that the distance between the vehicle 1 and the user terminal 3 is equal to or more than the predetermined distance may be determined, for example, from the respective positional information, or may be determined by the received power of the radio wave signal of the wireless communication of the electronic key system provided in the vehicle 1 and the user terminal 3 or the arrival failure of the signal. The method of the radio communication between the vehicle 1 and the user terminal 3 includes, for example, Bluetooth (registered trademark) Low Energy (BLE) and Wi-Fi, and is not limited to a particular method.

In the first embodiment, the cooler box stopping control process shown in FIG. 4 and the notification control process of the cooler box information shown in FIG. 5 are performed by DCM 1A, but the present disclosure is not limited thereto. For example, ECU 1B may execute a cooler box stopping control process and a notification control process of cooler box data. Further, for example, the center server 2, which is a device other than the vehicle 1, may execute the cooler box stop control process and the notification control process of the cooler box information. In this case, the center server 2 acquires the position information of the vehicle 1, the cooler box information, the remaining power of the battery 1D, and the on/off information of IGN switching 1F from the vehicle 1, holds the information of the location designated by the user regarding the notification, such as the excluded location information 12A, in the user information DB 22, and executes the cooler box stop control process and the notification control process of the cooler box information.

In addition, the cooler box stop control process and the notification control process of the cooler box information may be executed in cooperation between the vehicle 1 and the center server 2. For example, in the process shown in FIG. 5, the vehicle 1 may execute the process of OP 204 from OP 201, the vehicle 1 may transmit the position information of the vehicle 1 and the cooler box information to the center server 2, and the center server 2 may execute the process of OP 208 from OP 205.

The processes and means described in the present disclosure can be freely combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc read-only memory (CD-ROM), digital versatile disc (DVD), Blu-ray disc, etc.), a read only memory (ROM), a random access memory (RAM), an erasable programmable read only memory (EPROM), an electrically erasable programmable read only memory (EEPROM), a magnetic card, a flash memory, an optical card, and any type of medium suitable for storing electronic commands.

What is claimed is:

1. An information processing device comprising a control unit configured to:
    acquire information about a state of a cooler box mounted on a vehicle when the vehicle is parked; and
    perform a notifying process of notifying a user terminal associated with the vehicle of the information about the state of the cooler box, wherein:
    the information about the state of the cooler box includes information indicating an operation state of the cooler box and information indicating whether an object is accommodated in the cooler box; and
    the control unit is configured to, as the notifying process:
        determine to notify the user terminal when the object is accommodated in the cooler box and when the cooler box is empty and operating, and
        determine not to notify the user terminal when the cooler box is empty and not operating.

2. The information processing device according to claim 1, wherein the control unit is configured to:
    acquire position information on the vehicle; and
    determine, as the notifying process, whether to notify the user terminal according to whether the position information on the vehicle indicates a predetermined location registered in advance.

3. The information processing device according to claim 1, wherein:
    when the vehicle is parked, the control unit continues operation of the cooler box until a remaining battery capacity of the vehicle becomes less than a predetermined value when the cooler box is operating, and stops the operation of the cooler box when the remaining battery capacity becomes less than the predetermined value.

4. A method comprising causing a computer to:
acquire information about a state of a cooler box mounted on a vehicle when the vehicle is parked; and
perform a notifying process of notifying a user terminal associated with the vehicle of the information about the state of the cooler box, wherein:
the information about the state of the cooler box includes information indicating an operation state of the cooler box and information indicating whether an object is accommodated in the cooler box; and
the method includes causing the computer to, as the notifying process:
  determine to notify the user terminal when the object is accommodated in the cooler box and when the cooler box is empty and operating, and
  determine not to notify the user terminal when the cooler box is empty and not operating.

* * * * *